United States Patent Office 3,463,908
Patented Aug. 26, 1969

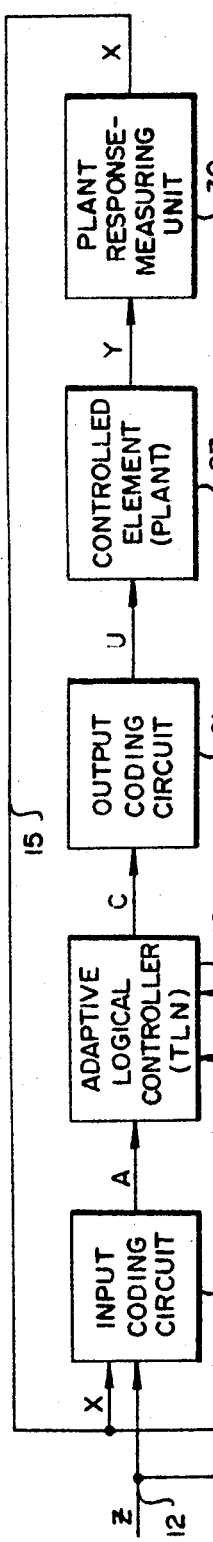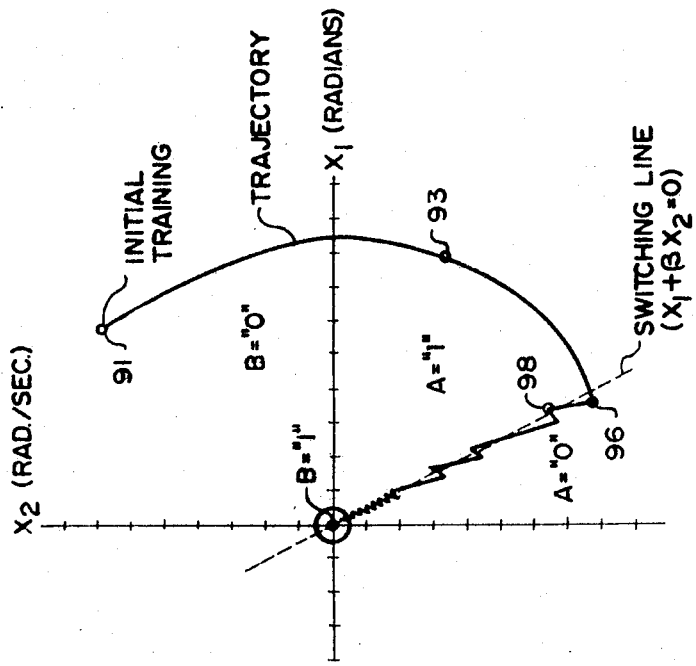

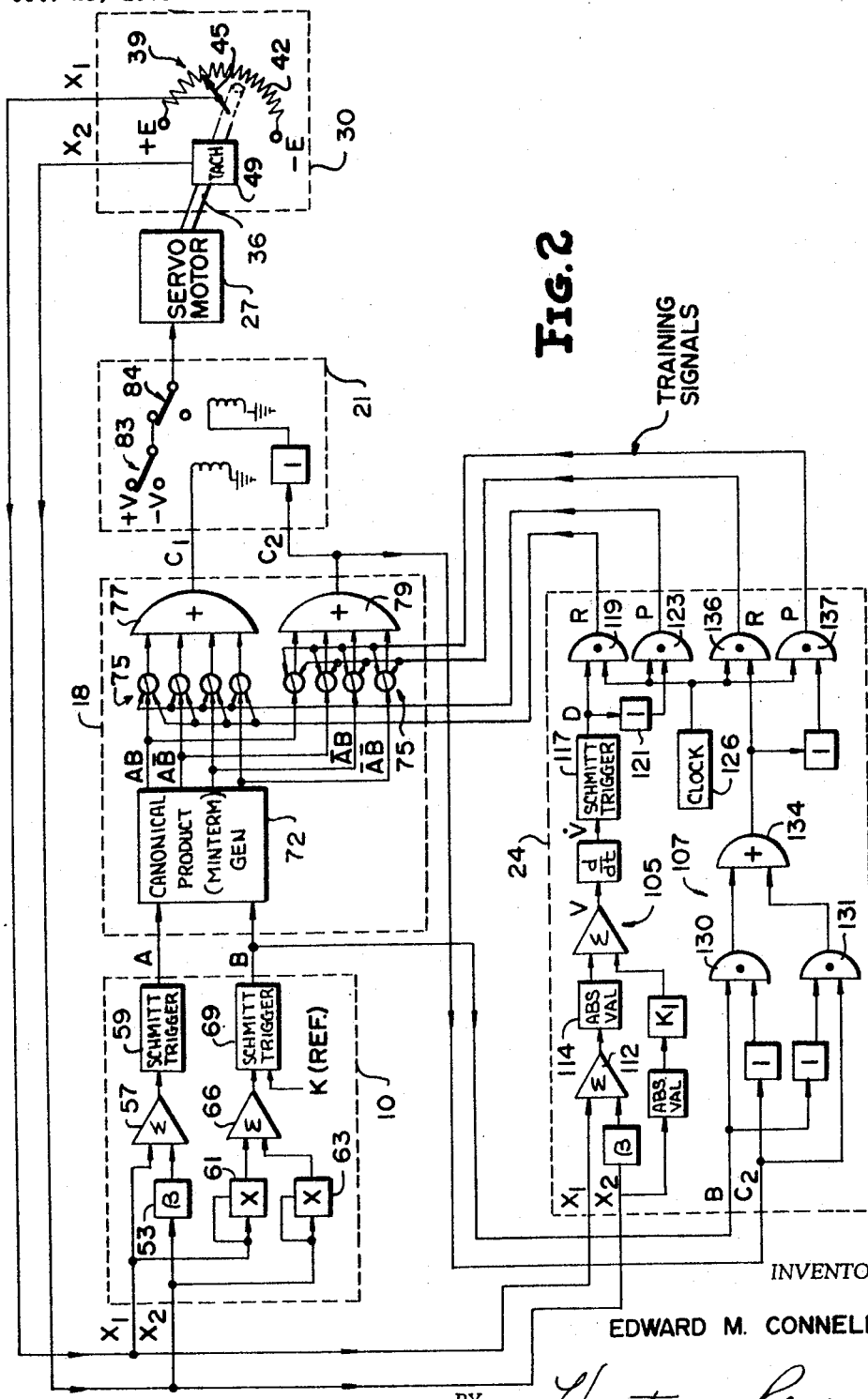

3,463,908
ADAPTIVE CONTROL SYSTEMS FOR IMPLEMENT-
ING STABILITY CRITERIA
Edward M. Connelly, Springfield, Va., assignor to Melpar,
Inc., Falls Church, Va., a corporation of Delaware
Filed Oct. 23, 1965, Ser. No. 504,021
Int. Cl. G06f 15/18
U.S. Cl. 235—150.1                13 Claims

ABSTRACT OF THE DISCLOSURE

A self-organizing control system provides stability direction to the operation of a plant by adaptive response to training stimuli developed from a Lyapunov function of the state variables of the plant to generate a control function that drives the plant to a stable operating state. The control system can be trained to rapidly accomplish this desired goal, with the Lyapunov function implemented within the goal circuitry of the control system.

---

The present invention relates generally to control systems and more particularly to control systems utilizing logical networks which are self-organizing or adaptive, in the presence of stimuli in the form of training signals, to govern system operation in accordance with a preselected objective. The organization of the logical controller toward the specified goal is accomplished by an internal generation of training signals derived from selected stability criteria.

The trainable logical network is a form of machine intelligence system wherein the network behavioral pattern is organized by training signals generated in accordance with predetrmined operating criteria, each training signal being indicative of the immediately preceding network performance. Typically, the trainable network comprises a plurality of statistical decision elements to which are applied electrical signals representing external or internal physical conditions as sensed by one or more appropriate transducers. Operation of each of these elements is governed by training signals indicative of whether or not the network is making decisions in accordance with a desired objective. The determination of whether a proper decision has been made, or whether the network is tending to make the proper decision, may be accomplished by reference to the manner in which a controlled element, termed a "plant," responds to the output of the trainable network.

The training signals are characterized in the art as being of either a reward or a punishment nature, indicative respectively of an improvement in performance or of a degradation of performance in the network's reaction to its inputs, relative to its immediate past performance. These training signals are generated by a goal circuit whose function is to organize the network toward a specific objective. To this end, the goal circuit is provided with a set of specified criteria often fixed in the form of information stored in a memory unit and repetitively compared with the actual network output data, as a means of evaluating and organizing network performance. Each decision element of the network may comprise a switch which is operative on a statistical basis to provide a connective (or not) between element input and output terminals, in accordance with the nature of the training signal applied to the element. Thus, the name statistical switch. In one form, the statistical switch has a plurality of possible operating states which define levels of probability that a network connective will be provided. If the probability that a switch will perform a certain connective is 50 per cent, there is equal likelihood that the switch will or will not perform that connective. The plurality of switch operating states are selected in accordance with the training signals supplied by the goal circuit to vary the probability, either upwardly or downwardly, according to the desired ultimate network response.

In accordance with the present invention the criteria defining the goal circuit function are selected to organize the trainable logic control network and the element or system controlled by the network, i.e., the plant, toward a stable operating state. The criteria are derived from a Lyapunov (sometimes Liapounov) function by circuit components responsive to information relating to the preceding performance of the plant. In other words, information as to past performance of the system is used by the goal circuit to train the logical network, by application of training signals to the statistical switches of the network, the training signals themselves being derived according to training rules from specific criteria (the Lyapunov function) which will depend upon the type of system involved.

Very briefly, a Lyapunov function is a mathematical function defining system stability, to be more fully discussed below, which is governed by the so-called "second method" of Lyapunov. In fact, the "second method" of Lyapunov is not a method at all, but a principle of physical reasoning or a theory which allows the stability of a physical system to be determined from the differential equations governing the system operation without the necessity of obtaining explicit solutions of those equations. The physical reasoning is as follows: If the rate of change of energy of an isolated physical system is negative for all possible states except one at which a state of equilibrium exists, then the energy will continually decrease until it assumes a minimum value corresponding to the energy of the system in that equilibrium state. The second method of Lyapunov is discussed in considerable detail in the literature (see, for example, the article by Kalmah et al., in the June 1960 edition of the Journal of Basic Engineering, at pp. 371–400), and need not be elaborated upon here. It is sufficient for present purposes to note that the physical reasoning may be set forth in mathematical form, in terms of a Lyapunov function defining the stability of the dynamic system under consideration; viz., a dynamic system is stable, that is to say, it returns to a condition of equilibrium after any perturbation, if and only if there exists for the system a Lyapunov function, a scalar function $V(x)$ of the state with the properties:

$$V(\vec{x}) > 0,\ \dot{V}(\vec{x}) < 0 \text{ when } \vec{X} \neq \vec{X}_e \qquad (1a)$$

$$V(\vec{x}) = \dot{V}(\vec{x}) = 0 \text{ when } \vec{X} = \vec{X}_e \qquad (1b)$$

where $$\vec{X}$$

is a vector representing the state of the system at any given instant of time $t$ and is itself a function of state variables $$X_i [\text{i.e., } \vec{X} = f(X_i)]; \vec{X}_e$$

is the vector representing the equilibrium state of the system; the dot above a term is the conventional representation of the derivative of that term with respect to time (i.e., $\cdot = d/dt$); and V is a scalar function of the state variables, and which may, for some systems, be equated to energy.

The present invention provides a self-organizing control system wherein an adaptive logical controller (trainable logical network) is employed to regulate the operation of a plant (controlled element), the adaptive controller responding to stimuli generated in the form of training (reward and punishment) signals by a goal circuit. Each training signal is derived by the goal circuit in response to input signals to the system and feedback signals developed by plant operation sensors. The internal circuitry of the goal circuit is operative to establish criteria (goals) in accordance with a preselected Lyapunov function to determine whether a reward signal or a punishment signal shall be generated as an immediate reinforcement of the behavior of the adaptive controller so that the system will organize itself or tend toward self-organization from an initial state toward some desired stable state of operation. The adaptive controller responds to the training signals to provide the proper connectives between an input coding circuit and an output coding circuit to effect this desired operation.

A necessary condition for the above-described operation of the self-organizing control system is that at least one logical function (corresponding to a state of the adaptive controller) exists which will provide a stable system. The existence of such a logical function, in turn, depends for a given plant on the Lyapunov function selected and the input/output coding technique employed.

If the probability that the goal circuit will generate a reward signal each time that a reward signal should be generated is designated by $P_{RR}'$ and the probability that the goal circuit will generate a punishment signal given that a punishment signal should be generated is designated by $P_{PP}'$ then it is evident that $0 \leq P_{RR} \leq 1$ and $0 \leq P_{PP} \leq 1$. The desired state of the system is an absorbing state, defined by a logical function to which the system will train and at which the system will remain. Such a state exists for $P_{RR}=1$, a condition in which the goal circuit will generate a reward signal each and every time such a signal should be generated. The primary consideration, however, lies in the implementation of a goal circuit by which $P_{RR}$ is maximized. It will be readily appreciated that the overall system will organize toward the desired state, an absorbing state, if reward training signals are successively generated by the goal circuit in accordance with desired plant response to the proper control exercised by the control system. It will also be noted that the particular value of $P_{RR}$ characterizes the training process of the controller while the value of $P_{PP}$ merely affects the speed of that training process. It is desirable, therefore, to develop a goal function in terms of a Lyapunov function, for a given system, which will result in $P_{RR}=P_{PP}=1$, but the maximizing of $P_{PP}$ is sacrificed in favor of maximizing $P_{RR}$ if the two objectives cannot simultaneously be achieved for a particular goal circuit.

It is important to observe that the system will organize toward a cyclic operation if $P_{RR} \neq 1$, since the desired state cannot be an absorbing state in such a case, but it is possible to force the organized solution from a cyclic to a stationary nature by increasing the memory of the statistical switches of the adaptive controller. Again, the important concept is the selection of a critical goal function (Lyapunov function) which will result in maximizing $P_{RR}$.

The importance of the goal function to the organization process is easily appreciated since it governs the nature of the process during training as well as the final organized state of the system. Training of an element in a dynamic closed-loop system involves consideration of the system characteristics in the final trained state in addition to the system characteristics (for example, stability) during the training process. These properties are of increased importance and concern if the organization times approach those of the dynamic system time-constants.

An important feature of the present invention is that systems in accordance therewith can rapidly reorganize after internal failures and are generally capable of compensating for changes in the controlled plant. These system characteristics result directly from the employment of the solution identification techniques of Lyapunov functions.

The plants or controlled elements of interest in conjunction with the present invention are those which can be represented by a set of differential equations of the form $$\vec{X}(t) = A(t)\vec{X}(t) + B(t)\vec{U}(t) \qquad (2)$$

where $\vec{X}$ is, as previously defined, a state vector of the controlled plant with components $X_1, X_2, \ldots X_N$;

$\vec{U}$ is a control vector of the adaptive logical controller with components $U_1, U_2, \ldots U_M$; and $A(t)$ and $B(t)$ are constant matrices. As a general proposition, the problem of controlling a plant of the type represented by Equation 2 is resolved by the determination of a control function $\vec{U}(t)$ which will result in a state function $\vec{X}(t)$ having properties defining a stable system. More particularly, the problem is one of finding a control function which will drive the system from some initial state to a stable equilibrium state with a sufficiently rapid speed of response. If the control function is of the form $$\vec{U}(t) = F(\vec{X}(t))$$

i.e., is itself a function of the state vector, then Equation 2 may obviously be rewritten as $$\vec{X}(t) = C(t)\vec{x}(t) \qquad (3)$$

It will be recognized that Equation 3 represents a free dynamic system if the control function is defined as indicated above. Measurements can be made of plant operation and taken together with appropriate Lyapunov functions to indicate the nature of the corresponding solution, whereby to provide the desired system stability without explicit knowledge of the solution, as previously explained.

It is convenient to provide geometrical representations of the solutions of differential equations of the type designated by Equation 3 as trajectories (phase-trajectory curves) in a phase-space plane (i.e., X—$\dot{X}$ plane in the phase space, where X is a state variable and $\dot{X}$ is the time rate of change of the state variable). See, for example, Korn et al., Mathematical Handbook for Scientists and Engineers, (McGraw-Hill 1961), §§ 9.5–2 et seq. for a detailed discussion of phase plane representations. This conventional practice will subsequently be employed in the detailed description of a specific embodiment of the invention.

At this point, having a free dynamic system, wherein the controlled plant is represented by a set of differential equations $\dot{X}_i = f_i (X_1, X_2, \ldots X_M; U_1, U_2, \ldots U_M) \quad i=1, 2, \ldots M$ where $X_i$ is a state variable, and $U_j$ is a control variable which for the above-defined control function is $U_j = F_j (X_1, X_2, \ldots X_N) \quad j=1, 2, \ldots M$ it becomes necessary to select a Lyapunov function V as the goal function of the adaptive logical controller whose control function is U, and to test the polarity of the derivative of that Lyapunov function. In other words, the control system is stable in the sense of an asymptotic convergence to the origin of the phase plane (the origin being a point or state of equilibrium for the system) if a positive definite function V of the state variables can be found such that its time derivative $\dot{V}$ along the trajectory of the system differential equations is negative definite. A positive definite function is one having at all times a positive value before reaching zero, the equilibrium point of interest, while a negative definite function has a negative value everywhere except at zero. If the derivative of the selected Lyapunov function is negative, polarity measurements of the derivative may be employed to generate training signals which will establish the desired stable system.

If a system employing a controller in accordance with the present invention is asymptotically stable (i. e., convergent) and the selected Lyapunov function is such that its time derivative V is negative definite, then the goal circuit will have a high probability ($P_{RR} \approx 1$, neglecting noise factors) of generating a reward signal, assuming that a reward is proper. On the other hand, if the system is unstable with the present controller and the Lyapunov function is sign (*sgn*) indefinite, say negative at some regions of the phase plane (phase space) and positive at other regions, then when $\dot{V}$ is negative the system is rewarded incorrectly. However, as previously pointed out this is not critical, the basic consideration being that at least one logical function, i.e., absorbing state of the adaptive logical controller, provides a stable system. The existence of such a function for a given controlled element (plant) depends on the Lyapunov function (V), the control function (U), and the input/output coding (i. e., conversion of input signals and measured output signals to logic signals and the output logic back to analog signals). In order that the adaptive logical controller provide desired connectives in accordance with a particular goal, it is essential that all regions of the phase space which are equivalent in terms of the input coding produce the same controller output.

Briefly, having discussed the primary concepts underlying the present invention, an illustrative embodiment of the invention comprises a system including a control loop and a training (goal) circuit, the control loop including an input coding circuit, an adaptive logical controller (trainable logical network, or TLN), an output coding circuit, a plant (controlled element), and a plant response-measuring circuit. The input coding circuit converts input signals and measurements of plant response into logical signals which are applied to the controller. In addition, the input signals and plant response measurements are fed to the goal circuit which selects a positive definite function V of the system state variables, measures the polarity of its derivative ($\dot{V}$), and generates training signals, reward or punishment, in accordance with that measurement. The controller is of a type that can be trained to provide any non-redundant logical function of its input variables in response to application of the training signals thereto. The controller may also include redundant circuits such that it will operate in the described manner despite certain internal failures. The logical output functions generated by the controller are applied to the output coding circuit which converts the digital logic to analog signals, e.g., voltages and currents, so as to exercise the control action, such as control of motor shaft rotation, reaction wheel, reaction jet, to name a few typical applications. The plant, in responding to the control signals has certain aspects of its operation detected by the response-measuring circuit, the latter thereby providing feedback signals which are applied to the input coder and to the training circuit along with the external input signals. Such a system is operative to organize the controller and hence itself, by means of training signals from the goal circuit, toward a stable state in a rapid manner. Thus, two of the major control problems involved in plant operation, viz. stability and quality (speed of response) are solved. In addition, the system is capable of retraining the controller to compensate for internal failures and changes in the plant.

Accordingly, it is a primary object of the present invention to provide control systems capable of self-organization toward stable operation.

Another object of the present invention is to provide self-organizing control systems wherein operational stability is established rapidly and efficiently.

It is a further object of the present invention to provide a trainable control system which is capable of achieving stability in rapid fashion and which is further capable of rapid retraining in the event of internal controller failures and/or changes in the controlled element.

A simple example wil suffice to illustrate certain of the difficulties involved in the provision of such systems. Assume that the plant under consideration is a single-axis space vehicle attitude control system and that the control task is to orient the vehicle at a given attitude. Mathematically, the transfer function of such a system is $$G(S) = \frac{K}{S^2} \quad (4)$$

(see, e.g., Korn et al., supra, §9.4–7), and the corresponding system differential equations are $$\dot{x}_1 = x_2$$
$$\dot{x}_2 = KU \quad (5)$$

where $x_1$ and $x_2$ are state variables, U is a control variable, and K a positive constant. The state variables correspond to attitude error, $\theta$, and attitude error rate, $\dot{\theta}$, in the following manner:

$$x_1 = \theta, \ x_2 = \dot{\theta} \quad (6)$$

Assume further that the logical function of the controller (i.e., the control variable U) is limited such that $$|U| \leq |U_{max.}| \quad (7)$$

A simply Lyapunov function is $$V = |\theta| + |\dot{\theta}| \quad (8)$$

and its derivative is $$\dot{V} = \frac{\partial |\theta|}{\partial \theta} \dot{\theta} + \frac{\partial |\dot{\theta}|}{\partial \dot{\theta}} \ddot{\theta} \quad (9)$$

$$\dot{V} = \text{sgn}(\theta) \dot{\theta} + \text{sgn}(\dot{\theta}) KU$$

since $\dot{x}_2 = \ddot{\theta} = KU$. It will be apparent, then, that for the phase space region where $$|\dot{\theta}| < |KU_{max.}| \quad (10)$$

there exists a control function U such that $$\dot{V} < \theta \quad (11)$$

This example illustrates the necessity of establishing proper input coding. As previously stated, in order that the desired control function U of the controller be dependably and consistently established, it is extremely desirable that all regions of the phase space which are equivalent in terms of control, be equivalently coded so as to provide identical controller output. Otherwise, in the situation illustrated by the above example, all points in the phase space region where $|\dot{\theta}| < |KU_{max.}|$ will not produce consistent controller output for a given control function. If, in the above example, the input coding is to be of a simple form the control function for the adaptive logical controller may be selected as $$|U| = |U_{max.}|$$
$$\text{sgn}(KU) = (\dot{\theta}) \quad (12)$$

so that the input coding to the controller need only distinguish between $\pm \dot{\theta}$. While this example illustrates the concepts and techniques involved in implementing the present invention, it will be noted that system response is poor in this illustration because of controller switching along the $\dot{\theta}$ axis. It will presently be shown, however, that the selected Lyapunov function may also be used to govern the speed of response of the system.

It is necessary to establish training rules for operation of the goal circuit, i.e., generation of training signals in response to the measurements of polarity of the Lyapunov function derivative, so that the system will organize itself toward a stable state, and will do so in rapid fashion. Three examples involving different conditions in the formulation of suitable training rules are now presented.

In the first example, the system is undisturbed during training, i.e., the input signals applied to the system are unvarying (for example, an external input equal to zero). The rule formulated is to reward each decision element (statistical switch) whose operation results in the Lyapunov function having a negative derivative, and to punish in all other cases; i.e., $\dot{V} > 0$, reward the present connective $\dot{V} \geq 0$, punish the present connective This type of training, termed Training Rule I for convenience, requires that some value of U must make $\dot{V}$ negative. If this were not true, i.e., if no value of U make $\dot{V}$ negative, then the system pursues random path searching, i.e., hunts for a proper but non-existent state of stability.

A second training rule is formulated to organize the system in the presence of a disturbance, in order to find the control variable U which makes $\dot{V}$ minimum relative to the previous values of $\dot{V}$ when the latter is positive. The basic idea is to reward the logical connective that makes $\dot{V}$ more negative than the previous value of $\dot{V}$ and to search for a minimum only when $\dot{V}$ is positive. Thus, if $\dot{V} < \theta$, reward, if $\dot{V} < \theta$, reward connective that provides U, such that $\dot{V}$ (x, U₁) ≤ $\dot{V}$(x, U), and punish all other connectives.

The measurement of a positive $\dot{V}$ triggers the search process and, after U₁ is found, $\dot{V}$ may be negative. On the other hand, if this is not the case, then the system trains to the "best" connective available and does not hunt as in the case of Training Rule I.

In accordance with the third Rule, tests of V are made at predetermined intervals of time to determine what value of the control variable (U) makes $\dot{V}$ most negative; i.e., what value of U (from an allowable set), say U₁, satisfies the requirement:

$\dot{V}(x, U_1) \leq \dot{V}(x, U)$

This search process can be rapid if U is allowed to take on only certain values, say $\pm U_{max}$. Thus, Training Rule III states: reward the logical connective which makes V most negative and punish all others.

With the above basic considerations in mind, the objects, features and attendant advantages of the present invention will become apparent from a consideration of the following detailed description of a specific embodiment thereof, especially when taken in conjunction with the accompanying drawings, in which:

FIGURE 1 is block diagram of a generalized form of control system in accordance with the present invention;

FIGURE 2 is a circuit diagram of an illustrative embodiment of the general system of FIGURE 1;

FIGURE 3 is a phase plane representation for the system embodiment of FIGURE 2;

Figure 4:
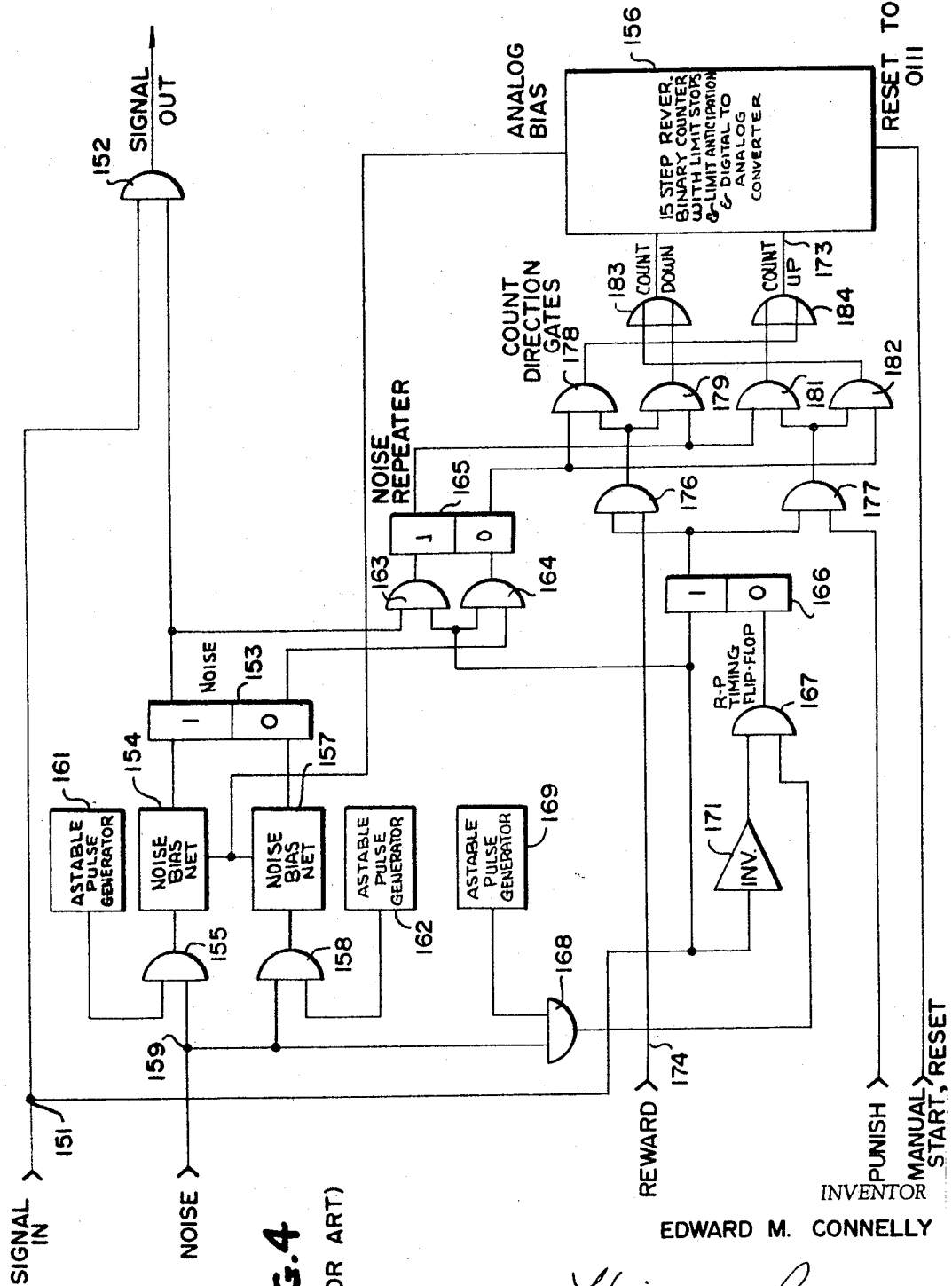
FIGURE 4 is a circuit diagram of a prior art form of statistical switch suitable for use in the embodiment of FIGURE 2.

Referring generally to the drawings and in particular to FIGURE 1, a control system in accordance with the present invention may comprise, in general, a control loop including an input coding circuit 10, an adaptive logical controller 18, an output coding circuit 21, a plant (i.e., a controlled element) 27, and a system response-measuring unit 30; and a training (i.e., goal) circuit 24.

A specific circuit embodiment of FIGURE 1 will be fully described presently, emphasis at this point being placed upon overall operation of the system. The response of plant 27 to the control function (U) is detected by measuring unit 30 which generates signals representative of and proportional to certain specified physical manifestations of that response. The generated signals may be selected to represent any number of quantities indicative of plant operation, depending upon the particular plant under observation and the specific control effort under consideration, but for purposes of simplicity and clarity it will be assumed that the detected quantities are indicative of response error and of error rate, relative to a desired response or state of the system. The selected quantities, then, may be viewed as representing state variables which collectively, at any given instant, uniquely describe a state of the system in the phase space.

The state variable—representative signals X generated by unit 30 are fed back for application to input coding circuit 10 via a feedback loop or channel 15. In addition, signals z, which may be time-varying or invariant and which originate from one or more sources (not shown) externally of the system, are applied as an input to coding circuit 10 via channel 12. The function of the input coding circuit is to encode or convert the analog signals supplied to its input terminals to digital logic signals suitable for application to adaptive logical controller (TLN) 18. In so doing, it is desirable that coding circuit 10 recognize and render equivalent those regions of the phase space describing states of the system which require the same control output (i.e., which require, for consistent stable control of the plant, the same control function U).

The coded logic is fed to controller 18 which is operative to provide connectives, on a purely statistical basis, for generation of logical functions of its digital input logic. Initially, that is, prior to training, each of the statistical decision elements in controller 18 has equal probability of providing a connective or of not providing a connective, a situation which will presently be seen to result in a maximum probability of 50 percent that the correct logical function or functions will be generated. However, each decision element has a plurality of possible operating states which may be characterized as successive levels of probability that a desired connective will be formed, and through proper training may be driven to the state which will result in the desired control function U being generated by output coding circuit 21. The logical output function generated by controller 18 must be converted to an analog signal or signals by which control over plant operation can be effected. To this end, coding circuit 21 is arranged to provide analog signals at its output terminals in accordance with a preselected coding of the controller-generated logical output functions. Plant 27 responds to the coded analog signals and the above-described cycle is repeated. Of course, if no training is provided, the plant operation is substantially aimless with relatively little likelihood that anything approaching a stable state will be attained.

In order to organize the system toward the desired equilibrium state, feedback signals x and external input signals z are also applied to a goal circuit 24 in which network stability criteria are developed by the formation of a Lyapunov function of the goal circuit input signals, differentiation of that function, and sensing of the polarity of the derivative. Depending upon the particular training rule employed for the system under consideration, reward and punish signals are generated by the goal circuit in accordance with the sign of the derivative (i.e., $\dot{V}$).

Each statistical decision element of controller 18 is provided with a reward input lead and a punish input lead, in addition to the leads required for application of logic signals derived from the coded output of coding circuit 10. The training of each decision element is accomplished according to the generation of reward and punish signals by goal circuit 24 until complete training is effected, whereupon the decision elements are constrained, in terms of a specific level of probability, to provide connectives which will result in the exercise of the desired control over plant operation. It will therefore, be seen that control systems in accordance with the present invention differ from prior art machine intelligence systems in the provision of specified goal functions, system training rules, and input/output coding by which to achieve rapid controlled operational stability of any given plant.

In the illustrative embodiment of FIGURE 2, it is assumed that the external signal applied to the system is a constant, for example zero, and that the control problem is to return the shaft of a servo motor from some initial ($t=0$) displaced position to the origin, i.e., a reference position describing the equilibrium state, the displaced position of the shaft being the result of some previous system perturbation (e.g., application of external signal at some time $t<0$).

The procedure employed to effect a solution of this control problem is as follows: A potential goal function (V) is selected and a test is made to determine whether the derivative ($\dot{V}$) of the selected function can be made negative, or at least minimized, anywhere in the phase space by appropriate selection of a control variable (U). If so, then the selected goal function is a Lyapunov function and is suitable for use in the derivation of training signals by the goal circuit. The selection and test of the goal function may be simply a trial and error process, although in this respect it will be recognized that an appropriate selection can be made initially on the basis of an "educated guess," or the process may be accomplished by mathematically solving for a suitable goal function. If the selected goal function is a Lyapunov function, then the system can be rendered asymptotically stable, i.e., convergent at a selected point in the phase space region, and that function indicates the convergence. The goal circuit is then implemented in terms of the V and $\dot{V}$ functions and a particular training rule consistent with the functions V and U. The input coding for the controller is so arranged as to render equivalent certain regions of the phase space, and in particular to render equivalent those regions that will require the same control value (U).

Referring now to FIGURE 2, there is shown one of many possible embodiments of the system of FIGURE 1 depending upon the particular type of plant whose operation is to be controlled. In this example, plant or controlled element 27 is a servomotor having a shaft which has undergone some angular displacement relative to a preselected reference position. It is assumed that the system perturbation was experienced at some time earlier than $t=0$, i.e., the time at which system training is initiated. In this particular situation, then, the external signal is zero, although it will be understood that the technique by which system control is to be exercised, as will presently be explained, is applicable to other constant (non-zero) external signal inputs or to time-varying inputs. Where a time-varying input signal is involved, however, additional considerations are necessary, such as determining the intercept for the system trajectory in the phase space region (here, a coordinate system of error and error rate, for example, and time) with the time-varying signal, based upon a prediction which can be only as accurate as the time required to achieve the curate as the time required to achieve the interception.

The selection of a servomotor as the controlled element in the example to be described has been made solely to simplify and clarify the explanation of system operation. It will be understood, however, that the plant may be a relatively complex system in itself, in which case the only other changes necessary in the structure and operation of the circuit of FIGURE 2 are in the goal circuit and the input/output coding. Each of these changes will be based on concepts and techniques identical to those employed in the circuit to be described, and will be readily apparent to persons skilled in the art from a consideration of the description.

The differential equation representing a servomotor is $$\ddot{y}+a\dot{y}=Ku \quad (13)$$

where $y$ symbolizes angular error, $u$ is the control variable, and $K$ and $a$ are positive constants. For the servomotor case, $y$ represents the angular orientation (position) of the shaft relative to an arbitrary reference position, and $u$ the torque required to rotate the shaft to the reference position and thence to maintain the shaft at that position. In other words, the control problem is to produce convergence (asymptotic stability) of the system trajectory to the origin of the phase space region. To this extent, the control variable $u$ is a limited function of the form $$|u|\leq| \quad (14)$$

It is convenient to put Equation 13 in a different form involving state variables $X_1$ and $X_2$ of the phase space, where $$X_1=y \quad (15)$$
$$X_2=\dot{y}$$

so that $$\dot{X}_1=X_2 \quad (16)$$
$$\dot{X}_2=Ku-AX_2$$

It will be recognized that the transfer function for a simple servomotor is $$G(s)=\frac{K}{S(S+a)} \quad (17)$$

representing the conventional complex plane (s-plane) notation.

In terms of the control problem, the objective is to bring the system to the point $X_1=X_2=0$ in a stable and rapid fashion, and the manner in which this is effected will be described with concurrent reference being made from time to time to the phase plane representation (i.e., a plane in the phase space) of FIGURE 3. Proceeding in the manner described above, it is necessary at this point to select a positive definite function V, where a suitable V is a function of the state variables ($X_i$) and the control variable ($u$) and is such that its derivative ($\dot{V}$) is minimized everywhere in the phase space by the selection of a realizable everywhere in the phase space by the selection of a realizable control variable $u$. A positive definite function is conventionally defined as being positive everywhere except at the equilibrium point of interest (in this example, at $X_1=X_2=0$) where it is zero.

A selected positive definite function is $$V=|x_1+\beta x_2|+k_1|x_2| \quad (18)$$

where $\beta$ and $k_1$ are positive constants. The derivative of the selected positive definite function V is then $$\dot{V}=\frac{dV}{dt}=\frac{\partial V}{\partial x_1}\dot{x}_1+\frac{\partial V}{\partial x_2}\dot{x}_2 \quad (19)$$

where $$\frac{\partial V}{\partial x_1}=\text{sgn }(x_1+\beta x_2)$$

$$\frac{\partial V}{\partial x_2}=\text{sgn }(x_1+\beta x_2)\{B\}+k_1\text{ sgn }(x_2)$$

so that $$\dot{V}=x_2\text{ sgn }(x_1+\beta x_2)+[\beta\text{ sgn }(x_1+\beta x_2)+k_1\text{ sgn }(x_2)]\,(Ku-ax_2) \quad (20)$$

If $\beta$ is selected such that $\beta>k$, then $$\text{sgn }[\beta\text{ sgn }(x_1+\beta x_2)+k_1\text{ sgn }(x_2)]=\text{sgn }(x_1+\beta x_2)$$

Thus, $\dot{V}$ is minimized everywhere in the phase space with respect to $u$ if $$\text{sgn }(Ku)=-\text{sgn }(x_1+\beta x_2) \quad (21)$$
$$|u|=1$$

The desired input coding is such as to render equivalent those regions of the phase space which require the same control output, i.e., the same output $u$ from output coding circuit 21. Since, from expression (21)

$$sgn\ (Ku) = -sgn\ (x_1 + \beta x_2)$$

it is apparent that $u$ is a constant, equal to $-1$ in the region where $(x_1+\beta x_2)>0$.

In order for the previously mentioned control task to be implemented, a minimum of three conditions must be met, viz either positive or negative torque must be applied to the servo shaft, depending upon its initial angular orientation, and once the shaft is returned to the reference position all torque must be removed. Hence, the output coding requirement may be stated $T=+1, -1,$ or $0$.

Since binary logic is obtained from the controller (TLN) 18 it is necessary, in this case, to provide a minimum of two binary signals to output coding circuit 21 if the three above conditions are to be attainable. In other words, each binary function produced by controller 18 has only two possible values, viz "1" or "0," and therefore, may be coded to provide only two possible controls. If a pair of parallel binary outputs (Boolean logical functions) is provided by controller 18, however, then up to four controls may be exercised and since only three are required the fourth may be unused. If the two logical output functions of the controller are designated $C_1$ and $C_2$, a suitable requirement for output coding circuit 21 is $$T=-1 \text{ if } C_1="1" \text{ and } C_2="1"$$
$$T=0 \text{ if } C_2="0" \quad\quad (22)$$
$$T=+1 \text{ if } C_1="0" \text{ and } C_2="1"$$

A suitable embodiment of the controller 18 is a trainable logical network of the type disclosed in the copending application of Halperin, Ser. No. 170,059, entitled "Generalized Self Synthesizer." Briefly, the Halpern application discloses a self-organizing binary logical network wherein each function of $n$ input variables may be synthesized with a maximum of $2n$ statistical switches. Stated somewhat differently, Halpern discloses a system which minimizes the amount of information necessary to organize the trainable network to its desired objective or goal. In essence, this is achieved in the following manner: The $n$ binary inputs applied to the trainable logical network are fed to a minterm generator which generates all of the non-redundant canonical products (AND functions) of those inputs. The canonical products are separately applied (i.e., in parallel) to separate ones of a like number of statistical switches for each output function desired. If $m$ output functions are to be generated, then a maximum of $m2n$ statistical switches are required. The probability that each switch will form the proper connective to provide the desired output functions (i.e., Boolean logical functions) is successively increased as a result of training afforded by a goal circuit which may, for example, have been preprogrammed to store the desired functions and which is operative to compare the generated functions with the stored functions and to reward or punish each switch accordingly.

If each statistical switch functions only to provide a connective, or not, each of the logical output functions $C_1$ and $C_2$ of the controller is, at any given instant, simply one or a sum (OR function) of the canonical products supplied to the switch inputs. Hence, it is sufficient that input coding circuit 10 supply a parallel pair of binary signals to controller 18 if each of the logical output functions $C_1$ and $C_2$ is, at any given instant, to have a value independent of the value of the other. As previously stated, it is desirable that the input coding render equivalent those regions of the phase space requiring the same control ($u$); otherwise, unnecessary effort is expended in implementing the input coding without any corresponding benefit. Referring to the phase plane diagram of FIGURE 3, and bearing in mind that $u$ is constant in the phase space region where $(x_1+\beta x_2)>0$, one of the coded binary inputs to controller 18 may simply distinguish between positive and negative (or zero) values of $(x_1+\beta x_2)$, i.e.

$$A="1" \text{ if } (x_1+\beta x_2)>0$$
$$A="0" \text{ if } (x_1+\beta x_2)\leq 0 \quad\quad (23)$$

To this end, A is assigned a value of binary "1" for the region above the switching line of the system (where $x_1+\beta x_2=0$) and a value of "0" (i.e., $\bar{A}$) below the switching line (see FIGURE 3).

The second binary coded input to the controller may be selected in accordance with the desired region of convergence of the system trajectory in the phase plane. If a circle of radius $\sqrt{K}$ about the origin is selected as the region indicative of the desired convergence (and in which the system would perform a limit cycle, or search, if it were not ultimately required to cease operation once the desired convergence is attained), then the second binary coded input, B, may be selected as having the values $$B="1" \text{ if } x_1^2+x_2^2<K$$
$$B="0" \text{ if } x_1^2+x_2^2\geq K \quad\quad (24)$$

That is, $B="1"$ if the state variables $(x_1, x_2)$ defining the state of the system describe a point within the circle, and $B="0"$ (i.e., $\bar{B}$) if the point is outside or on the boundary of the circle.

While it is entirely possible and relatively simple to provide a goal circuit which can reward or punish all of the statistical switches in the controller in accordance with a single function, it is more desirable in this case, from the standpoint of increasing the speed of response of the system, to provide two separate goal circuit portions which derive training signals in accordance with separate criteria. This is because it is ultimately desired that the system in this example attain a rest condition, an objective which may not ordinarily be desired and which is being discussed solely for the purpose of providing a better understanding of the invention, and because such a condition need not be governed by a Lyapunov function.

It will be noted that the result of training of the system should be (if $K>0$ and $a>0$)

$$C_2=B \quad\quad (25)$$

irrespective of the value of A. That is, once the trajectory of the system is within the confines of the circle $$(x_1^2+x_2^2)<K$$

then $B="1"$ (i.e., B) and the desired objective has been reached. Under such conditions the value of A, whether "1" or "0," is immaterial. Hence, a suitable goal function for that portion of the goal circuit providing training (reward and punish) signals to the statistical switches that supply the logical output function $C_2$ of controller 18, is $$R=\bar{B}C_2+B\bar{C}_2$$
$$P=\bar{R} \quad\quad (26)$$

This, of course, is simply the logical notation for the statement: Reward if either B or $C_2$ is "0"; otherwise, punish.

System switching, on the other hand, is dependent upon the output logical function $C_1$ of controller 18 (recall that the torque T is either positive or negative depending upon the binary value of $C_1$, provided $C_2="1"$), and therefore, the training of the statistical switches providing the output $C_1$ is to be accomplished in accordance with the stability criteria of a Lyapunov function. The training rule (discussed above) which is to govern the operation of this portion of goal circuit 24 depends upon the selected goal function (V) and upon the type of controlled element and system input signals involved. If some value of the control function ($u$) will make the derivative (V) of the goal function negative (i.e., $\dot{V}<0$), then in the present example (i.e., system undisturbed during training) the training rule designated I may be employed.

From Equation 20 it will be noted that if $\beta$ is greater than $k_1$ the term involving $k_1$ may be disregarded (i.e., by setting $k_1=0$) without changing the desired control function. This corresponds to the semidefinite form of the selected Lyapunov function, and it may be stated as a general proposition that if the semidefinite form of the selected positive definite function (i.e., the goal function or Lyapunov function) yields the same information, or substantially so, as the positive definite form, then it is much simpler to implement the required goal circuit in terms of the semidefinite form. Thus, from expressions (20) and (21).

$$\dot{V} = sgn \ (X_1 + \beta X_2) \ \{\beta K U + (1 - \beta a) X_2\} \quad (27)$$

and the problem is now to find whether there exists a value of $u$ such that $\dot{V} < 0$, so that Training Rule I, viz.

$$\dot{V} < 0 \rightarrow \text{reward}$$
$$\dot{V} \geq 0 \rightarrow \text{punish}$$

can be used as the criteria for the goal circuit portion supplying training signals to the switches producing the $C_1$ output of controller 18. For this property (i.e. existance of such a control function $u$) to hold, it is only necessary to show that $$|\beta K u| > |(1 - \beta a) X_2| \quad (28)$$

It will readily be observed from Equation 16 that $$X_2 \rightarrow 0 \text{ as } |aX_2| \rightarrow |Ku| \quad (29)$$

Thus, $$|aX_2| \leq |Ku| \quad (30)$$

or since $a > 0$, $$|X_2| \leq |Ku/a| \quad (31)$$

In order for expression (28) to be true, then, it must be shown that $$|\beta| > \frac{|1 - \beta a|}{a} \quad (32)$$

Several values of $\beta$ will satisfy this relation; for example $$\beta = 1/a \quad (33)$$

Therefore, assuming any one of the suitable values of $\beta$ is selected, the portion of goal circuit 24 under consideration may be implemented in accordance with Training Rule I.

Having established the set of necessary and sufficient conditions under which effective control of the servomotor 27 may be exercised to return its shaft 36 in an asymptotically stable fashion to the reference position, the overall circuit may be implemented as shown in FIGURE 2. Shaft 36, may, of course, be coupled by a suitable drive train to other apparatus (not shown) which is to operate in accordance with the control exercised on the servomotor.

A typical example of a position sensing element for system response-measuring unit 30 is a potentiometer 39 comprising a resistive component 42 connected across a voltage source E and a rotatable slider arm 45 mechanically coupled to the shaft and electrically connected to an output terminal of the unit. In this manner, as shaft 36 is displaced from its angular reference position a voltage proportional to that displacement and representative of the state variable $X_1$ is generated on one of the pair of signal leads at the output of the unit. Similarly, the angular velocity of the shaft is sensed, for example by a conventional tachometer 49 which produces an output voltage proportional to the velocity of rotation of the shaft in radians per second and representative of the other state variable $X_2$.

The voltages generated by measuring unit 30 are fed back in parallel to input coding circuit 10, to which is also applied an external (i.e. to the system) signal Z, here assumed to be zero during the training process. The voltage representative of $X_2$ is applied to a $\beta$ scaling unit 53, which may be simply a conventional resistive divider network, so that the output of unit 53 is an analog voltage $\beta X_2$. The latter voltage and $X_1$ are applied to summing amplifier 57, providing an input $X_1 + \beta X_2$ to Schmitt trigger circuit 59. The Schmitt trigger is operative to provide an output pulse representative of a binary "1" (i.e. A) if $(X_1 + \beta X_2)$ is greater than a preselected threshold voltage, here slightly greater than zero, and a binary "0" (i.e. $\bar{A}$) if $(X_1 + \beta X_2) \leq 0$. The binary logical output A (or $\bar{A}$, as the case may be) is produced as one output of coding circuit 10. The second output B (or $\bar{B}$) of the input coder is derived by squaring each of the inputs $X_1$ and $X_2$, in multipliers 61, 63, respectively, summing the two squared signals in summing amplifier 66, and applying the sum signal as a trigger voltage to a second Schmitt trigger 69 which provides a binary "1" (B) if $(X_1^2 + X_2^2) < K$ (the threshold voltage) and a binary "0" ($\bar{B}$) if $$(X_1^2 + X_2^2) \geq K.$$

The A and B logic signals produced by input coding circuit 10 are applied to minterm generator 72 of controller 18. As described in the aforementioned Halpern application, the minterm generator includes inverters and (AND function) involving that term is also "0." Moreover, as will be apparent from a simple truth table, one and only one canonical product can have the value "1" for any given pair of binary input terms. Each of the $2^n$ canonical products (four product terms in this example) is applied to a separate statistical switch 75 of the group of switches for each of the $m$ logical output functions. Since, as previously explained, two output functions, $C_1$ and $C_2$ are desired, $m_2^n = 8$ switches are employed, four switches in each group. Hence, only one switch of each group will, for any given pair of binary inputs to minterm generator 72, have a "1" applied. Each of switches 75 is operative on a statistical basis to provide a connective to an OR gate (77, 79) associated with its respective switch group. Since, absent any training of the switches, each switch has an equal probability of providing a connective, or not, to the associated OR gate, it will be apparent that $C_1$ or $C_2$ may have a "0" value despite the application of a "1" to one of the switches of each group. The complete structure and operation of a suitable trainable logical network (i.e. controller 18) are fully disclosed in the referenced Halpern application. To aid the reader in gaining a complete understanding of the present invention, however, an embodiment of a statistical switch, reproduced from Halpern, will be described presently. It is sufficient to note at this time, that each statistical switch has a plurality of possible states of being open or closed, and a level of probability of being open or closed associated with each state. By using effective criteria (goals) and by appropriate application of reward and punish signals from the goal circuit, each switch may be trained to assume the state of greatest probability that it will be open or closed, as desired, to provide the proper logic output function(s) from the trainable logical network. Obviously, then, such a network is only as dependable as the goal circuit utilized to train it. If the goal circuit is subject to failure then the statistical switches are similarly subject to failure, in addition to any failures occurring in the switches solely as a result of faults in their own operation. However, the mark of an effective self-organizing logic network is not only in its freedom from failures but in its ability to re-train itself rapidly after a failure has occurred. The Halpern network is admirable from both points of view, and it is an object of the present invention to further increase the capability of the entire system to re-train rapidly after failures wherever they may occur, e.g. in the plant, the controller, even in the goal circuit.

As previously stated, it is desired that a negative torque be applied to servo shaft 36 if both logical output functions $C_1$ and $C_2$ of controller 18 have a value "1", that positive torque be applied if $C_1$="0" and $C_2$="1", and that zero torque be applied if $C_2$="0" irrespective of the value of $C_1$. To this end, output coding circuit 21 may include a pair of relays 83, 84, each having a pair of contacts, a switch arm, and an associated relay coil. The switch arm of relay 83 is normally biased to connect a positive voltage terminal to servomotor 27, and, upon energization of the relay 83 coil, to connect a negative voltage terminal to the servomotor, resulting in operation of the servomotor to apply positive and negative torque, respectively, to shaft 36. The switch arm of relay 84 is normally biased to permit application of either the positive or negative voltage to the servomotor, depending upon the state of relay 83. Upon energization of the relay 84 coil, however, the switch arm of that relay is thrown to a ground terminal, thus causing the servo to cease operation.

In describing the operation of coding circuit 21, assume first that both $C_1$ and $C_2$ have values of "1" represented by a voltage pulse of, say, six volts magnitude. The $C_1$ pulse energizes the coil of relay 83 resulting in a negative voltage, say, −10 volts, on the switch arm, while the $C_2$ pulse is inverted (i.e. the "1" is inverted to a "0") by inverter 87 so that relay 84 continues to permit application of voltage to servomotor 27, here producing the desired negative torque. Similarly, it will readily be observed that if $C_1$="0" and $C_2$="1", positive torque is applied to shaft 36, while if $C_2$="0" no torque is applied to the shaft despite the value of $C_1$.

Referring again to the phase plane diagram of FIGURE 3, if it is assumed that initially, i.e. at the start of training, the state of the system is described by the point 91 (representing coordinates $x_1$ and $x_2$ at that time) successive application of negative torque to the shaft will rapidly result in changes of state of the system to the switching line described by $(x_1+\beta x_2)=0$. Throughout the phase plane region above the switching line $A$="1" and $B$="0", while below the switching line $A$="0" and $B$="0", except for that small region described by the circle $(x_1^2+x_2^2)=K$ within which $B$="1". It will be apparent, then, that switching from negative to positive torque (or vice versa) occurs along the switching line and is solely a function of the binary value of A until convergence at the origin is achieved.

Returning now to FIGURE 2, goal circuit 24 comprises, for the embodiment herein described, a pair of circuits 105, 107, one of which is employed to organize (train) the switches providing connectives for logical function $C_1$, and the other to organize the switches associated with function $C_2$. Again, a single goal circuit may be provided to organize both sets of switches, this being a slightly less efficient operation for the system control to be exercised in this particular example.

In operation, signals $x_1$ and $x_2$ are applied to circuit 105, the latter signal scaled by the factor $\beta$, and both signals applied to summing amplifier 112, whose output is thus $(x_1+\beta x_2)$. The sum signal is applied to an absolute value network 114, and the output of the latter is $|x_1+\beta x_2|$, the semidefinite form of the selected Lyapunov function V. If desired, the positive definite form of V may be provided by feeding signal $x_2$ through an absolute value network and $k_1$ scaling network for summation with the semidefinite form signal, but this is unnecessary where as, in this case, the semidefinite form provides substantially the same information as the positive definite form. In any event, the resulting signal, representative of V, is differentiated to provide a signal representing $\dot{V}$. The latter signal is applied to Schmitt trigger 117 which is operative to provide a positive pulse, for example, if $\dot{V}$ is less than the threshold voltage, here slightly less than zero, and no pulse (or a negative pulse) if $\dot{V}$ is greater than or equal to zero. The operation of trigger circuit 117 is simply an implementation of Training Rule I which, as previously discussed, was found to be usable for determining the generation of training signals for this particular system.

Designating the output of trigger circuit 117 as a binary number D, it will be appreciated that $$D="1" \text{ if } \dot{V}<0.$$
$$D="0" \text{ if } \dot{V}\geq 0$$

Reward signals are to be generated if $D$="1", and punish signals if $D$="0". To this end D is supplied to an AND gate 119 and, via logical inverter 121, to a second AND gate 123. The other input terminals of the AND gates are coupled in parallel to a clock 126 having a PRF much greater than that of trigger circuit 117. In this manner, reward and punish signals are sequentially applied to switches 75 of the switch group associated with logical function $C_1$, according to the requirements of Training Rule I.

Circuit 107 is arranged to implement the reward and punishment requirements for the training of statistical switches 75 in the switch group assoicated with logical function $C_2$, and to generate the training signals accordingly. To this end, logic signals B and $C_2$ are applied in parallel to each of AND gates 130, 131, one of each signal being inverted prior thereto so that AND gate 130 provides an output $B\overline{C}_2$, and AND gate 131 an output $\overline{B}C_2$. The two outputs are fed to OR gate 134, producing an output $\overline{B}C_2+B\overline{C}_2$ which is fed to a pair of AND gates 136, 137, also supplied by pulses from clock 126, for generation of training signals in accordance with the rule $$R=\overline{B}C_2+B\overline{C}_2$$
$$P=\overline{R}.$$

The rule states: if $B$="1", reward if $C_2$="0", punish if $C_2$="1"; if $B$="0", reward if $C_2$="1", punish if $C_2$="0". The significance of this rule will be appreciated by reference again to FIGURE 3. Note that if $B$="1" the desired convergence of the system has been attained, a situation which should be accompanied by an absence of torque on servo shaft 36, i.e. $C_2$="0". The coexistence of these values of B and $C_2$ is an indication that the group of switches associated with the generation of $C_2$ have provided the proper connectives and should be rewarded. On the other hand, if $B$="1" is accompanied by $C_2$="1", then torque, either positive or negative depending on the value of A, will be applied to the servo shaft; but this is obviously incorrect because convergence at the origin $(x_1=x_2=0)$, of the phase plane should result in removal of power to the servomotor. Hence, the switches have not formed the proper connectives and punishment should follow. Turning to the situation in which $B$="0", it is apparent that the equilibrium state of the system has not yet been reached, so that power should be applied to the servomotor (i.e., $C_2$="1"), calling for a reward; absence of torque (i.e., $C_2$="0"), however, calls for punishment.

Referring to FIGURE 4, there is shown an embodiment of a prior art statistical switch (see application Ser. No. 160,965 of Lee, filed Sept. 14, 1961, entitled "Self Synthesizing Machines," and the above mentioned Halpern application, both copending herewith) suitable for use as each of switches 75 of adaptive logical controller 18. The description will be brief since reference may be had to the disclosures of the two copending application mentioned above for a more detailed description. Each switch is provided with four input leads, one each for input signal (canonical product), random noise, reward signal, and punish signal. A single random noise generator (not shown) may be employed to supply the noise input to each of the switches, if desired.

The principles of operation of the statistical switch are as follows: If a gate circuit is supplied with means for providing an adjustable set of discrete bias levels, and the gate is permitted to pass input logic signal only when the applied noise level exceeds the bias level existing at any given instant, then the bias level may be adjusted to increase or to decrease the probability that it will be exceeded by the noise level, and, hence, the probability that the input logic will be passed or will be prevented from passing. Adjustment of bias level is accomplished by application of reward or punish signals to the switch. If the bias level is initially (i.e., prior to training) set equal to the mean level of the noise generated by the random noise generator, then statistically the switch should pass signal 50 percent of the time and inhibit passage the remaining 50 percent. Thus, either a reward or a punish signal should function to increase or decrease the bias level relative to mean noise level, depending upon the switch state, and thereby vary the probability that a signal path (i.e., a connective) will be provided. The reward and punish signals should not affect all switches, however, since this could result in rewarding improper connectives and punishing proper connectives. If only one of the group of switches controlling an output function can receive as a logical input a binary "1" at any given time, then the switches may be so arranged that only the switch to which the "1" input is applied may respond to the training signals.

To illustrate the operation of the statistical switch of FIGURE 4, assume that a logical "1" has been applied to the "signal in" lead and should have been passed via AND gate 152, but that no concurrent logical "1" was supplied to gate 152 by flip-flop 153. This incorrect operation results in the application of a punish signal to all statistical switches connected to the goal circuit training signal leads, but in order for the punish signal to affect the operation of a switch, a "1" must be passed via AND gate 177 to which the punish signal (a "1") is applied as one input. The other input of gate 177 can be a "1" (and thus provide a "1" output from the gate) only if flip-flop 166 is in the "1" state, and this condition in turn depends upon the presence of a "1" at the "signal in" lead. Since our original assumption was that a "1" is in fact applied to that lead, gate 177 supplies an output to one input lead of each of AND gate 181 and 182. The presence of a "1" at the other input of either of the two latter gates depends upon the state of flip-flop 165. If "1"'s are supplied to both inpunts of gate 181, then OR gate 184 will provide a "count-up" signal to reversible binary counter 156, resulting in any increase in the bias level at bias network 154. It is apparent that this will reduce the probability of a switch connective since it is then less likely that the noise voltage level, represented by the amplitude of pulses emanating from AND gate 155 when pulses are applied to that gate from pulse generator 161, will exceed the bias level.

Hence, the punish signal will correctly affect the switch operation, in this example, only if a logical "1" is applied from gate 182 to OR gate 183, resulting in a "count-down" signal to counter 156 (and a corresponding decrease in the bias level). In addition to the requirement of "1"'s at each of the "punish" and "signal in" leads, then, flip-flop 165 must be in the "0" state, for only then will "1"'s be applied to both inputs of gate 182. Whether flip-flop 165 is the "0" state depends upon whether "1"'s are applied to both inputs of AND gate 164. One of these inputs is supplied from the "signal in" lead and the other from flip-flop 153. It is apparent that flip-flop 153 must be in the "0" state and, hence, that both inputs of gate 164 are provided with "1"'s, since it was originally assumed that no connective was provided by the switch, a condition requiring that the state of flip-flop 153 be "0". Thus, the bias level at bias network 154 is decreased and the probability that a connective will be provided is increased.

Similar analyses of switch operation are readily apparent for the remaining possible conditions of: a switch connective when no connective is desired (punish), switch connective when a connective is desired (reward), and no connective when no connective is desired (reward). The determination of whether an increase or decrease in bias level is desired for each of the four possible states of the switch is dependent upon the inputs applied to count direction gates 178, 179, 181, and 182.

Obviously, only one of these gates can provide an output at any given time.

Having described the structure and operation of the various components of the exemplary embodiment of the present invention, overall system operation will now more clearly be understood by reference again to the phase plane diagram of FIGURE 3. Assume that the present state of the system is described by point 93 along the trajectory curve, which constitutes the locus of the coordinate $x_1$, $x_2$ for successive states of the system. At point 93, A has the value "1" and B the value "0." Consequently, only canonical product $A\overline{B}$ of the products generated by minterm generator 72 can have the value "1." It is desired that negative torque continue to be applied to servo shaft 36 until system trajectory is at the switching line, and this in turn requires that $C_1$="1" and $C_2$="1" (see the requirement set forth in expressions (22), above. Such operation will occur if both $A\overline{B}$ switches (i.e., both statistical switches to which the $A\overline{B}$ product is applied) provide connectives. If this is indeed occurring, then it is apparent that $V=|x_1+Bx_2|$ is decreasing so that the $\overline{V}$ function has a negative slope, i.e., $\overline{V}<0$. (Note that V decreases as the trajectory approaches the switching line, where $x_1+\beta x_2=0$, and increases as the trajectory moves away from the switch line.) Schmitt trigger 117 of goal circuit portion 105 will therefore provide an output $D$="1," resulting in the generation of reward signals to the $A\overline{B}$ switch associated with OR gate 77, so that the probability that $C_1$ will continue to have the value "1" is increased.

If at point 93, $C_1$ were "0," then positive torque would be applied to the shaft if $C_2$=1, or no torque if $C_2$=0. In either event $\overline{V} \geq 0$, resulting in the generation of punish signals to the switch under consideration. Thereby, the switch is driven toward higher levels of probability that the desired connective (resulting in $C_1$="1") will be provided.

If the $A\overline{B}$ switch of the switch group associated with OR gate 79 (and logical function $C_2$) has formed a connective, then $C_2$="1," and since $B$="0" in the phase plane region containing point 93, $\overline{B}C_2+B\overline{C}_2$ (i.e., the function formed by goal circuit portion 107) has the value "1," resulting in the rewarding of that switch. If $C_2$, however, has the value "0," indicative of a non-connective condition of the switch, then $\overline{B}C_2+B\overline{C}_2$="0" and the switch is therefore punished. This enhances the probability that the connective will be formed.

At the switching line, where $(x_1+\beta x_2)=0$, the training of both $A\overline{B}$ switches has long since been completed; that is, the highest level of probability that each will provide a connective has been attained. Thereafter, if the state of the system is described by state variables $x_1$, $x_2$ within the phase space region $A$="1," $B$="0" (so that $A\overline{B}$="1"), negative torque is applied to the shaft.

At point 96, just beyond the switch line, A has the value "0" (B continuing to have the value "0"). The values of A and B are, of course, functions of input coding circuit 10, operative upon the feedback signals representative of state variables $x_1$ and $x_2$, and illustrate the importance of providing a coding circuit that will code those regions of the phase space requiring the same control function in an equivalent manner. For $A$="0" and $B$="0," only canonical product $\overline{AB}$="1"; hence, only the $\overline{AB}$ switches are "active." The desired operation here is that positive torque be applied to shaft 36, requiring that $C_1$="0" and $C_2$="1." Thus, the $\overline{AB}$ switch associated with OR gate 77 should not provide a connective while the other $\overline{AB}$ switch, associated with OR gate 79, should form a connective. It will readily be appreciated from an analysis similar to that given above for the case of negative torque desired, that the $\overline{AB}$ switches are rapidly trained to the desired states, so that operation will continue back and forth along the switching line as the trajectory curve converges upon the origin. When $B=$ "1," within the circle about the origin, operation ceases for at that state $C_2=$ "0" (no torque), assuming the appropriate switches are trained. It will be recognized that the radius of the circle can be made small so that the desired convergence is complete.

It will further be appreciated that not all canonical products of the input coded signals need be generated and therefore that not all $m2^n$ statistical switches need be provided. However, the employment of $2^n$ switches for each of the $m$ output functions to be generated by the controller will be necessary in more general applications, and is desirable, in any case, to take care of any possible eventuality in system operation.

The implementation of Training Rules II and III, discussed above, may be accomplished in a manner similar to that by which goal circuit portion 105 was provided, involving simply the derivation of $\overline{V}$ and the generation of training signals in accordance with the logic required by Rules II and III. Such implementation will be readily apparent to those skilled in the art from a consideration of the preceding portion of the specification.

While I have described and illustrated one specific embodiment of my invention, it will be clear that variations of the details of construction which are specifically illustrated and described may be resorted to without departing from the true spirit and scope of the invention as defined by the appended claims.

I claim:

1. In a system for controlling the operation of a controllable element which can be represented by a set of differential equations of the form $$\vec{\dot{X}}(t) = A(t)\vec{X}(t) + B(t)\vec{U}(t)$$

where $$\vec{X}$$

is a vector representing the state of said element at any given instant of time $t$ and has components $X_1, X_2, \ldots X_N$, $$\vec{\dot{X}}$$

is the time rate of change of $$\vec{X}, \vec{U}$$

is a vector representing a logical function by which control may be exercised over said element and has components $U_1, U_2, \ldots, U_M$, and $A(t)$ and $B(t)$ are constant matrices, means for detecting the response of the controllable element to the control exercised by said system and for generating analog signals proportional to and representative of that response; means responsive to said analog signals for encoding thereof in the form of logic signals, wherein analog signals indicative of potential response of said controllable element representing a state of said element for which the same exercise of control by said system is required are equivalently encoded; trainable means responsive to the encoded logic signals for generating logical control functions therefrom; means responsive to the generated logical control functions for exercising control over the operation of said controllable element in accordance therewith; and training means further responsive to said analog signals for supplying training signals to said trainable means to cause the generation of a logical control function $U(t)$ by said trainable means that will drive said controllable element to a desired stable state without explicitly solving said set of differential equations.

2. The invention according to claim 1 wherein said trainable means includes means for forming canonical products of the encoded logic signals, and a plurality of statistical decision elements to which said canonical products are applied for passage or blockage thereby, each of said decision elements including adjustable means for varying the probability that the respective decision element will pass the canonical product applied thereto, and means for logically combining the canonical products passed by said decision elements to generate said logical control functions; and wherein said training signals are effective to selectively adjust said probability varying means to control the probability that any particular canonical product will be passed by a decision element and thereby, the probability that a particular logical control function will be generated by said trainable means.

3. The invention according to claim 2 wherein said training means comprises circuitry implementing a stability function V of state variables $X_j$; defining the operational state $$\vec{X}$$

of said controllable element as a function of time, where $$V(\vec{X})$$

has the properties $$V(\vec{X}) > 0, \dot{V}(\vec{X}) < 0 \text{ when } X \neq X_e$$

$$V(\vec{X}) = \dot{V}(\vec{X}) = 0 \text{ when } X = X_e$$

$j=1, 2, 3, \ldots, N$, and $X_e$ is a vector representing said desired stable state of said controllable element, and further circuitry implementing a set of training rules to govern the character of the training signals supplied by said training means to said trainable means, and thereby the adjustment of said probability varying means of the decision elements, said training rules being selected in accordance with the result of processing of said analog signals via said stability function-implementing circuitry.

4. The invention according to claim 1 wherein said encoding means comprises circuitry for converting said analog signals to digital logic signals representative of control regions encompassing transitory states of the controllable element in the phase space representation of solutions of the differential equations for said controlled element, the number of control regions represented by said digital logic signals being dependent upon the number of distinct controls to be exercised on said controllable element, said encoding means constructed and arranged to produce equivalent digital logic signals in response to those input signals ultimately producing controllable element states the movement from which to said desired stable state requires equivalent control.

5. The invention according to claim 4 wherein said trainable means comprises: means for generating a plurality of non-redundant logical product functions of said digital logic signals, identical groups of statistical decision elements, each group consisting of a plurality of decision elements at least equal in number to the number of non-redundant logical product functions necessary to provide the minimum number of controls required for said controllable element, each decision element having a plurality of states corresponding to a plurality of levels of probability that a logical product function applied to the decision element will be passed thereby, means for applying each of the generated logical product functions to a respective decision element in a group of decision elements, and means associated with each group for producing a logical summation of the product functions passed by the decision elements of the associated group as a separate logical control function, so that the number of separate logical control functions generated by said trainable means corresponds to the number of groups of decision elements therein, the latter number being selected to permit the generation of sufficient separate logical control functions to exercise the required number of controls over said controllable element.

6. The invention according to claim 5 wherein said means responsive to the generated logical control functions comprises means for converting the logical control functions to forces of a form and of magnitude and direction suitable for exercising the desired control over said controllable element.

7. The invention according to claim 6 wherein said training means comprises circuitry implementing a preselected stability function of state variables of said controllable element, and further circuitry implementing a set of training rules by which the nature of the training signals supplied to said trainable means is governed in response to the results of processing said analog signals via said stability function-implementing circuitry; said decision elements being responsive to said training signals for selective control of the probability states thereof.

8. A self-organizing network for controlling the operation of controllable apparatus, comprising means for sensing the operational state of the controllable apparatus and for generating signals representative of that state; means, including a trainable logical network, for exercising control over the operation of said controllable apparatus at least partially in response to said state-representative signals; means for applying said state-representative signals to said control exercising means; and training means, including circuitry implementing a stability function $$V(\vec{X})$$

of state variables indicative of operational states of said apparatus relative to a path leading to a stable state, where $$V(\vec{X})$$

has the properties $$V(\vec{X}) > 0, \dot{V}(\vec{X}) < 0 \text{ when } X \neq X_e$$

$$V(\vec{X}) = \dot{V}(\vec{X}) = 0 \text{ when } X = X_e$$

and where $$\vec{X}$$

is a vector representing the state of said apparatus at any given time $t$ and is itself a function of the state variables $X_j$, $J=1, 2, 3, \ldots, N$ of said apparatus, $X_e$ is a vector representing said stable state, and $$\dot{V}(\vec{X})$$

is the derivative with respect to time of the function $$V(\vec{X})$$

and further circuitry for testing the derivative V(X) of said function for specific states of said controllable apparatus in response to processing of said state-representative signals via the stability function-implementing circuitry, for controlling the operation of said trainable logical network, and thereby the control exercised over the operation of said controllable apparatus, in accordance with the sign of said derivative; the sign of said derivative being indicative of the present state of said apparatus relative to said path.

9. A system for stably controlling the operation of controllable apparatus, comprising, in combination, means responsive to system input signal effecting the form of control over said apparatus and to feedback signal indicative of the response of said apparatus to its control for conversion of said signals to digital logic representative of the state of the system relative to a desired stable state, further means for converting logical functions of said digital logic to energy of a form and in an amount to control the operation of said apparatus, adaptive means for generating logical functions of said digital logic on a statistical basis, means for applying said digital logic produced by the first-named means to said adaptive means, means for applying the logical functions generated by said adaptive means to said further means, and means responsive to said input signal and to said feedback signal for producing signal stimuli to force said adaptive means toward a fixed operational state wherein the logical functions generated by said adaptive means are effective to drive said apparatus toward said stable operational state.

10. A self-organizing system for controllably stabilizing the operation of a force-sensitive device having at least one stable state, said device being adapted to respond in a prescribed manner to application of forces of specified form, magnitude, and direction; said system comprising input coding means for converting input signals applied thereto to representative digital logic, wherein each input signal tending to ultimately produce the same device response is converted to equivalent digital logic; adaptive means responsive to digital logic supplied by said input coding means for generating logical functions thereof; output coding means responsive to logical functions generated by said adaptive means for converting each logical function to force of said specified form having magnitude and direction commensurate with that logical function; means responsive to the operation of said device for detecting the instantaneous character of state variables representative of the operational state of said device and thereby indicative of the response of said device to application of forces by said output coding means, and for feeding back signals to said input coding means representative of said detected variables; means further responsive to said input signals and to the feedback signals for developing stability criteria therefrom, said stability criteria developing means including means for forming a stability function of sad input signals and said feedback signals, where said stability function is greater than zero and the derivative with respect to time of said stability function is less than zero when said device is in a state other than said stable state, and said stability function and said derivative thereof are equal to zero when said device is in a state corresponding to said stable state, means for differentiating said formed stability function with respect to time, means for detecting the polarity of the derivative, and means responsive to the detected polarity for generating training signals; said adaptive means including means responsive to training signals to vary the probability that a particular logical function will be generated by said adaptive means; and means for applying said training signals to said adaptive means to variably enhance the probability that said adaptive means will generate logical functions of said digital logic that drive said device to said stable state.

11. Apparatus for controlling a system having a plurality of operational states including a stable state, comprising means for sensing the instantaneous operational state of the system and for generating signals indicative thereof, means for processing said signals to determine the relationship of the instantaneous state of the system to a series of potential transitional states of the system defining a stable control function that leads to said stable state, means for generaing signals representative of said relationship for forcing the operation of said system into said series of transitional states, and means responsive to said relationship-representative signals for guiding the operation of said system, said guiding means including a trainable logical network comprising a plurality of switches each having a plurality of states representative of levels of probability that a signal applied to the switch will be supplied as an output thereof, means for converting said operational state-indicative signals to digital control functions, said logical network responsive to said relationship-representative signals to control the states of said switches to provide output combinations of said control functions for controlling the operation of said system.

12. The combination according to claim 11 wherein said means for processing comprises circuitry implementing a Lyapunov function of state variables of the system indicative of said series of transitional states, said Lyapunov function having the properties that it is greater than zero and its time derivative is less than zero for operational states of said system other than said stable state, and that both it and its time derivative are zero for said stable state, and wherein said means for generating signals representative of said relationship comprises means for testing the processing of said operational state-indicative signals by said Lyapunov function-implementing circuitry to determine whether the operation of said system is proceeding toward or away from said series of transitional states.

13. In a system for stabilizing the operation of a controllable device, circuit means for establishing a goal function representative of desired operation of said device, means for detecting the operational state of said device and for supplying signals indicative thereof to said circuit means to determine whether said operation state conforms to said goal function, a trainable network for supplying control signals to said device, and means responsive to the determination of whether said operational state conforms to said goal function for generating stimuli in the form of training signals to reward or to punish the operation of said trainable network according to said determination, wherein said circuit means for establishing a goal function comprises a circuit for processing said operational state-representative signals as a Lyapunov function defining the operational stability of said device, said Lyapunov function constituting a function of state variables of said device and having a value greater than zero and having a time derivative whose value is less than zero when the operational state of said device is unstable, and having a value of zero, corresponding to the value of its time derivative, when the operational state of said device is stable.

References Cited

UNITED STATES PATENTS

| | | |
|---|---|---|
| 3,278,770 | 10/1966 | Shoh. |
| 3,346,726 | 10/1967 | Rouxel et al. _ _ _ _ _ _ 235—150.1 |
| 3,389,243 | 6/1968 | Peschon _ _ _ _ _ _ _ _ _ _ 235—150.1 |

FOREIGN PATENTS 1,389,427  1/1965  France.

OTHER REFERENCES

"Principles of Automatic Optimizers," Measurement and Control, July 1963, by M. A. Alzerman, pp. 279–284.

MALCOLM A. MORRISON, Primary Examiner

R. W. WEIG, Assistant Examiner

U.S. Cl. X.R.

235—172.5